Sept. 17, 1940.  J. SUNNEN  2,214,940

PISTON EXPANDER

Filed Jan. 12, 1939

INVENTOR
JOSEPH SUNNEN
BY George R. Ericson
ATTORNEY

Patented Sept. 17, 1940

2,214,940

UNITED STATES PATENT OFFICE 2,214,940

PISTON EXPANDER

Joseph Sunnen, Clayton, Mo.

Application January 12, 1939, Serial No. 250,604

9 Claims. (Cl. 309—12)

This invention relates to piston expanders and, more particularly, to devices which are adapted to be permanently mounted within the wall of a slotted skirt piston. Pistons for internal combustion engines are subjected to great variations of temperature and are operated under conditions which would tend to dislodge any member which might be attached to the piston, so that it is desirable to make the expander of as few parts as possible and to attach it to the piston by more rigid means which is incapable of being dislodged by shaking. Pistons of the type to which this expander is adapted may require more or less expansion according to the condition of wear, and, when expanded to approximately the right size, must still have some degree of flexibility, particularly if the piston is made of material having a high coefficient of expansion, such as a lubricant.

It is an object of this invention to provide a piston expander of very simple construction which may be made of light weight and of only two parts.

It is a further object of this invention to provide a piston expander of the above described character which is positively retained in position on the piston independent of any frictional or other locking devices which might be capable of being jarred off in operation.

It is a further object of this invention to provide a piston expander of the above described character which may be made from sheet metal.

It is a further object of this invention to provide a piston expander which is capable of expanding the piston to a selected degree, whether small or great, and to still provide for any slight expansion or contraction of the piston under variations of temperature.

The invention will be better understood from the following description and accompanying drawing, referring to which, Figure 1 is a vertical sectional view of a typical piston showing my improved expander applied thereto.

Figure 1:
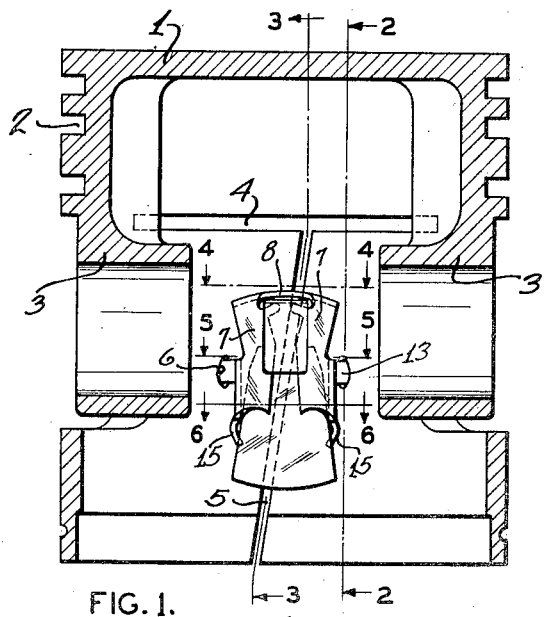
Figure 4:
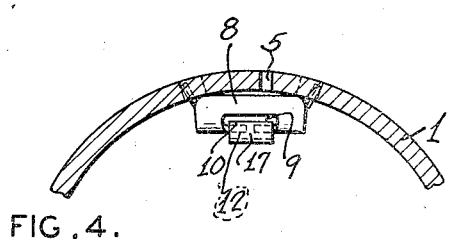
Figure 4 is a partial plan view taken along the line 4—4 of Figure 1 looking in the direction of the arrows.
Figure 5:
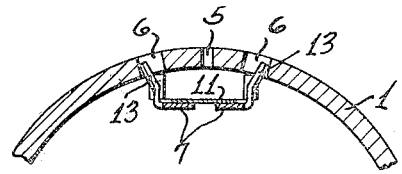
Figure 6:
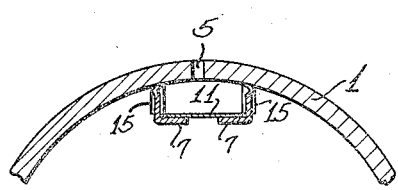

Figures 5 and 6 are similar to Figure 4, except that they are taken along the lines 5—5 and 6—6 of Figure 1, respectively.

Figure 7:
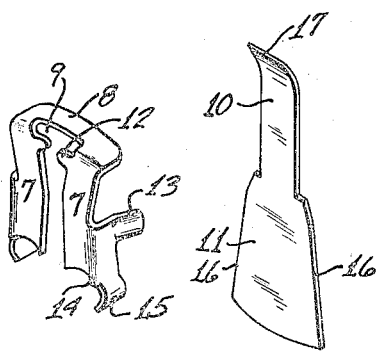

Figure 7 is a perspective view showing one of the members of my improved expander.

Figure 8:
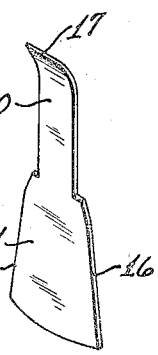

Figure 8 is a perspective of the wedge member of my improved expander.

The reference numeral 1 indicates a typical piston of an internal combustion engine having the usual ring groove 2, wrist pin bosses 3, cross slot 4, and vertical or bias slot 5. Such pistons are normally provided with a T-slot on each side, that is, the slots 4 and 5 between the bosses, so as to permit the expansion and contraction under the influence of pressure and temperature. Preparatory to installation of my piston expander, the pistons are provided with a pair of holes 6, one on each side of the slot 5. These holes are drilled radially with respect to the piston and have slightly diverging walls, which arrangement permits the expander to be more uniformly held in place.

The expander is formed of sheet metal and comprises a pair of substantially parallel side portions 7, the surface of these portions lying in the same plane, and the upper ends being joined by a transverse portion 8. This portion is bent over to the side, out of the plane of the side portions, to form the slot or opening 9 which receives the tail or guide portion 10 of the wedge member 11.

The fork member or main body member of the expander is provided with small projections 12 to assist in guiding the member 10. The outer sides of the lower ends of the side portions are bent to substantially right angles with the plane thereof, and these bent-over portions are provided with diverging projections or lugs 13 which are adapted to engage the holes 6 in the piston. It will be understood that a slight bending of the transverse portion 8 will effect the proper preliminary adjustment of the distance between the projections 13 so as to fit them into the holes in the piston. This feature is particularly important if the holes are not accurately drilled in the piston at the proper distance from each other.

This arrangement permits a wide range of adjustment, not only to take care of variations in the drilling of the holes in the piston, but also to allow adjustment to take care of different amounts of wear. The flexing of the expander to provide this preliminary adjustment is accomplished by means of bending the transverse member 8 in a plane parallel to the surfaces 7.

After the wedge is in position and the projections 13 in contact with the outer sides of the holes 6, there is no further bending of the transverse member, but driving in the wedge causes a slight springing or flexing of the members 13 in a plane perpendicular to the surfaces of the members 7, and also causes a twisting action to be set up between the members 7 and the transverse portion 8. Thus, the action of the parts under the influence of the wedge involves some flexibility and resiliency, but this flexing is much less in degree than that permitted by the bending of the transverse member 8 for preliminary adjustment.

At the lower end of the side portions, a wedge receiving shoulder 14 is formed, and adjacent each of the shoulders 14 is a projection 15 which, with the shoulder 14 and the side portions, forms a guide for the functioning part of the wedge.

Figure 2:
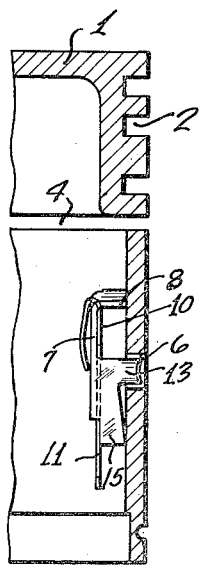
Figure 2 is a partial sectional view taken along the line 2—2 of Figure 1 looking in the direction of the arrows.
Figure 3:
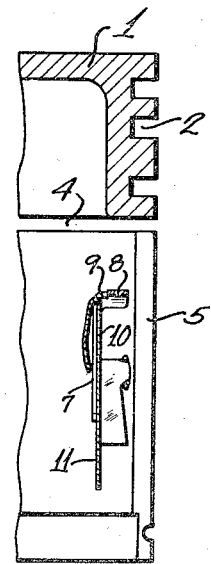
Figure 3 is a partial sectional view taken along the line 3—3 of Figure 1 looking in the direction of the arrows.

The wedge 11 is formed of sheet metal stamping with the cam surfaces 16 adapted to coact with the shoulders 14, while the tail 10 extends up through the slot 9 to guide the wedge while it is being driven into place. It will be noted that the other end of the wedge is bent as indicated at 17, to enable the operator to more conveniently grip the wedge member to finally bend it over to the position shown in Figures 1, 2 and 3 after the wedge has been driven in to the desired position.

In operation, the mechanic takes the worn piston and marks the centers of the holes 6 on the opposite sides of the slots 5. For this purpose, a small templet is used. The construction of these templets is well known in the art and requires no particular description here. Having drilled the holes 6 at the desired distance, or bends the expander so that the projections 13 properly fit into the holes, the operator then inserts the wedge and drives it in, until the piston is expanded to the desired diameter. He then bends over the tail 10 of the wedge so that it cannot be accidentally displaced. In the preliminary adjustment of the device, the operator bends the transverse portion 8 in a direction parallel to the surfaces of the members 7, then, by driving in the wedge, he sets up a tension or spring action in a plane vertical to the plane of said surfaces. The portion 8 is easily flexible, while the springing action set up by the wedge is only slightly flexible, and the pressure acting against the walls of the piston is much higher than that required to bend the portion 8.

A particular advantage of this feature of the invention is that the expander can easily be given its preliminary adjustment to the holes in the piston, and then the wedge can be driven in to expand the piston to any desired extent, and, when the piston is so expanded to the desired size, there is still some resiliency in the device to compensate for temperature variations, expansion, wear, etc.

It will be understood that the invention may be used in various forms, and I do not wish to be limited in my protection, except in accordance with the proper scope of the following claims.

I claim:

1. In a piston expander, a member having a pair of projections, one of said projections being adapted to engage the piston on each side of a slot, said member having guide means, and a wedge member mounted between said guide means and being adjustable to forcibly separate said projections, and means for holding the said members in position relative to each other when adjusted, said wedge comprising a sheet metal member of greater width at one end than at the other end, the narrow end of said wedge being adapted to be bent over after assembly to hold said wedge in adjusted position.

2. In combination, a piston expander comprising a member having a pair of projections for engaging openings at opposite sides of a slot in the wall of a piston, and an infinitesimally adjustable wedge for spreading said projections to expand the piston, said wedge having a portion adapted to be bent after the said projections have been spread, to hold the wedge in position.

3. A piston expander member comprising a sheet metal stamping, said member having a pair of substantially parallel side portions lying in the same plane, said portions being joined at one end by a transverse portion in a different plane, said side portions having piston engaging projections, guide means near the ends of said side portions opposite said transverse portions, and a wedge member adapted to be received by said guide means and to be driven into a selected position between the ends of said side portions to adjustably spread said projections and means for securing said wedge member in the selected position.

4. A piston expander member comprising a sheet metal stamping, said member having a pair of substantially parallel side portions lying in the same plane, said portions being joined at one end by a transverse portion in a different plane, said side portions having piston engaging projections, guide means near the ends of said side portions opposite said transverse portions, and a wedge member adapted to be received by said guide means and to be driven into a selected position between the ends of said side portions to adjustably spread said projections, said wedge member having a portion adapted to be bent over after it has been driven to the selected position in order to prevent the displacement of the wedge.

5. A piston expander comprising a pair of sheet metal stampings, one of said stampings being formed with a pair of side portions having projections, said projections being constructed and arranged to engage openings formed on opposite sides of a slot in the wall of the piston said side portions being joined at one end by a transverse portion, the other of said members being formed as a wedge adapted to be driven between said side portions at a point substantially spaced from said transverse portion.

6. In combination, a sheet metal stamping having parallel side portions lying in the same plane, said side portions being connected at one end only by a transverse portion substantially out of the plane, said side portions being formed at the ends opposite said transverse portion to receive a guide and a wedge, guide means formed between said transverse portion and said side portions, and a sheet metal wedge member having a large wedge-shaped end adapted to be driven between the ends of said first-named member opposite said transverse portion, said wedge member having an extension adapted to pass through and be guided by said guide means.

7. In a piston expander, a sheet metal member having means for engaging a piston on opposite sides of a slot in the skirt thereof, said member having a highly flexible portion whereby said engaging means may be moved a substantial distance from each other, means for forcibly separating said engaging portions, said first-named member having a portion of comparatively slight flexibility to permit slight changes in the relative position of said engaging means in the said opposite sides of said slot due to frame expansion or contraction of the piston.

8. In a piston expander, a member having a pair of projections adapted to engage the piston on opposite sides of a slot in the skirt thereof, said projections being connected by a sheet metal member, said sheet metal member comprising portions of comparatively slight flexibility adjacent each of said projections and a portion of comparatively great flexibility between said portions of slight flexibility, said member being formed with guide means, and a wedge adapted to be guided by said guide means, the inclined portion of said wedge being adapted to contact said member against said slightly flexible portions and said highly flexible portions, whereby said projections may be adjustably separated, and means for holding said first named member in adjusted position.

9. In a piston expander, a member having a pair of projections adapted to engage the piston on opposite sides of a slot, said projections being connected by a sheet metal member, said sheet metal member comprising portions of comparatively slight flexibility adjacent each of said projections and a portion of comparatively great flexibility between said portions of slight flexibility, said member being formed with guide means and a wedge adapted to be guided by said guide means, the inclined portion of said wedge being adapted to contact said member between said slightly flexible portions and said highly flexible portions whereby said projections may be adjustably separated, said wedge having a bendable tail portion adapted to be bent over after passing through said guide portion to hold the wedge in adjusted relation.

JOSEPH SUNNEN.